United States Patent Office 3,256,145
Patented June 14, 1966

---

3,256,145
SYNERGISTIC PESTICIDAL COMPOSITION
Hilary F. Goonewardene, Moorestown, N.J., assignor to Smith Kline & French Laboratories, Philadelphia, Pa., a corporation of Pennsylvania
No Drawing. Filed Jan. 23, 1964, Ser. No. 339,613
17 Claims. (Cl. 167—22)

This invention relates to synergized pesticidal compositions for improved pesticidal compositions. In another aspect, the invention relates to carbamate pesticides and enhancement of their effectiveness.

It has heretofore been recognized that a broad range of carbamate compounds are valuable pesticidal materials, being selectively effective in the control of insects, mites, nematodes, fungi, and weeds.

An increasingly significant trend in modern day pest control is the growing number of species of pests, particularly insects, which are resistant to the standard pesticides, such as the halogenated hydrocarbons, and the organophosphorus compounds. These insect species now exceed 100.

Part of the solution to the resistant pest lies in shifting to newer types of pesticides, typically the less hazardous and more selective carbamates. Generally, the carbamates are significantly more expensive than are the pesticides which are used as standards. Allowing for their proven killing action for resistant as well as susceptible pests, cost of the newer and usually more effective carbamates is a major limiting parameter to their use wherever the resistant pest problem calls for remedial measures. The need for substantially reducing carbamate pesticide cost to the user, or appreciably increasing the effectiveness of an available supply, is self-evident.

According to the present invention, there is provided an organic compound which through its incorporation into the pesticide shows unexpected and remarkable effectiveness in enhancing the killing power of a given amount of carbamate pesticides, and thereby acting as a true synergist.

The novel pesticide of this invention comprises a major portion of a salt of carbamic acid (carbamates) of demonstrated pesticidal activity and a synergistically effective minor portion of β-diethylaminoethyl 2,2-diphenyl-pentanoate hydrochloride (SK & F No. 525–A).

Although the HCl salt of the synergist is advantageously employed, the free base or other readily prepared salts, which have a desirable lipophilic-hydrophilic balance, (whether water soluble or not), are suitable for use in the present invention. The free base is an oil boiling at about 200° C. at 10 mm. pressure, and can be admixed with the carbamate salt. It can be further conventionally formulated to provide a pesticidal spray, a dry formulation, or the like, as well known in the art.

The following are illustrative of carbamate pesticides which may be synergized by the synergist of this invention:

5,5-di-methyl-3-oxo-1-cyclohexen-1-yl-dimethyl carbamate.
Ferric dimethyl dithio carbamate.
Manganese ethylenebis di-thio carbamate.
Di-sodium, ethylenebis di-thio carbamate.
Zinc ethylenebis di-thio carbamate.
Zinc dimethyl di-thio carbamate.
Bis-(dimethyl thio carbamoyl) disulphide.
1-naphthyl-N-methyl carbamate.
1-isopropyl-3-methylpyrazolyl-5-dimethyl carbamate.
6-methyl-2 propyl-4-pyrimidinyl dimethyl carbamate.
3-methyl-1-phenyl-5-pyrazolyl dimethyl carbamate.
Sodium N-methyl di-thio carbamate.
4-dimethyl amino-3-5 xylyl methyl carbamate.
1-dimethyl carbamoyl-5-methyl-3-pyrazolyl dimethyl carbamate.
3,5-di-iso propyl phenyl-N-methyl carbamate.
4-(methyl thio)-3,5 xylyl N-methyl carbamate.
o-Isopropoxyphenyl N-methyl carbamate.
4-dimethylamino-3-tolyl N-methyl carbamate.
Diammonium ethylene bis di-thio carbamate.
Phenyl mercuric dimethyl di-thio carbamate.
2,3-dichloroallyl N,N di-isopropylthio carbamate.
4-chloro-2-butynyl N-(3-chlorophenyl)-carbamate.
(4-chloro-2-butynyl N-chlorocarbanilate.)
Isopropyl N-(3-chlorophenyl) carbamate.
Isopropyl N-phenyl carbamate.
Methyl N-(3-4-dichlorophenyl) carbamate.
[Methyl N-(3-4-dichloro) carbanilate.]
n-Propyl, N-ethyl N-(n-butyl) thiol carbamate.
Ethyl N,N-di-n propyl thiol carbamate.
2-chloroallyl N,N diethyl di-thio carbamate.

The foregoing list of pesticidal carbamates may be conveniently categorized into four groups, the alkyl bis carbamates, the alkyl bis thio carbamates, the alkylene bis di thio carbamates, and the aryl carbamates. Each of these groups is generally associated with particular types of pesticidal activity, although there are numerous instances of broad spectrum activity.

The synthesis of the aforelisted commercial pesticides is well known, and does not form a part of the invention of the present disclosure. Numerous references in the patent and general chemical literature teach practical means for manufacture of these compounds, and are not repeated here in the interest of brevity. In any event, chemists skilled in the art of pesticide synthesis can readily establish practical methods of manufacture. In most instances, pesticide formulators and/or users can purchase readily in the open market carbamate pesticides which may be synergized in accordance with the teachings of this invention.

Insecticide test procedure

The following procedure was employed in testing the pesticide synergist according to the present invention. The test carbamate pesticides were diluted, using reagent acetone to an initial concentration as outlined in Table Ia. Preliminary biological screening consisted of 2 micrograms of the diluted pesticide per microliter of acetone applied topically to the dorsal thorax of each fly of a plurality of a susceptible strain of housefly (*Musca domestica*—L. Wilson strain), by means of a micrometer-driven syringe. Ten 4-day-old houseflies were placed in a petri dish with a wick soaked in milk. Two petri dishes of 10 houseflies each, constituted replicates for each pesticide. The results are shown in Table Ia.

A standard, or control, consisting of pesticide alone; SK & F No. 525–A synergist alone in acetone; a control of reagent acetone; and an untreated check were included with each test run. Percent insect mortality was determined and recorded 24 hours after topical application. Each pesticide was tested at least 4 times.

A secondary biological screening with resistant flies, i.e., "A" strain-resistant to chlorinated hydrocarbons, organophosphorous, and carbamate insecticides was carried out, with the compounds of Table Ia.

The results of these screenings are shown in tabular form in Table Ib.

TABLE Ia.—EFFECTS OF COMPOUND SK & F No. 525-A ON TOXICITY OF CARBAMATE PESTICIDES TO SUSCEPTIBLE ADULT FEMALE HOUSEFLIES; PESTICIDES AND SK & F NO. 525-A APPLIED JOINTLY BY TOPICAL APPLICATION

| Pesticide Material | Concentration | | Percent mortality in 24 hours, Wilson strain flies (average of at least 4 separate replicated tests) | | |
|---|---|---|---|---|---|
| | Weight carbamate per volume acetone (percent w./v.) | In, p.p.m. | SK & F 525-A alone 0.5% w./v. equals 5,000, p.p.m. | Pesticide Material alone | Pesticide plus SK & F 525-A at 2 μg./female (0.1% w./v.) |
| Sevin [1] | 0.3 | 3,000 | 0 | 35 | 80 |
| Pyrolan [2] | 0.02 | 200 | 0 | 7 | 49 |
| Isolan [3] | 0.01 | 100 | 0 | 3 | 68 |
| Dimetilan [4] | 0.005 | 50 | 0 | 11 | 88 |
| Zectran [5] | 0.02 | 200 | 0 | 30 | 87 |

[1] 1-naphthyl-N-methyl carbamate.
[2] 3,methyl-1 phenyl-5-pyrazolyl dimethyl carbamate.
[3] 1-isopropyl-3-methylpyrazolyl-5-dimethyl carbamate.
[4] 1,dimethyl carbamoyl-5-methyl-3-pyrazolyl dimethyl carbamate.
[5] 4-dimethyl amino-3-5 xylyl methyl carbamate.

TABLE Ib.—EFFECTS OF COMPOUND SK & F NO. 525-A ON TOXICITY OF CARBAMATE PESTICIDES TO RESISTANT ADULT FEMALE HOUSEFLIES, PESTICIDES AND SK & F NO. 525-A APPLIED JOINTLY BY TOPICAL APPLICATION

| Pesticide Material | Concentration | | Percent mortality in 24 hours "A" strain flies (average of at least 4 separate replicated tests) | | |
|---|---|---|---|---|---|
| | Weight carbamate per volume acetone (percent w./v.) | In, p.p.m. | SK & F 525-A alone 0.5% w./v. equals 5000, p.p.m. | Pesticide Material alone | Pesticide plus SK & F 525-A at 2 μg./female (0.1% w./v.) |
| Sevin [1] | 10.0 | 100,000 | 0 | 29 | 75 |
| Pyrolan [2] | 0.05 | 500 | 0 | 17 | 67 |
| Isolan [3] | 0.1 | 1,000 | 0 | 10 | 87 |
| Dimetilan [4] | 0.02 | 200 | 0 | 10 | 64 |
| Zectran [5] | 0.5 | 5,000 | 0 | 3 | 33 |

[1] 1-naphthyl-N-methyl carbamate.
[2] 3, methyl-1 phenyl-5-pyrazolyl dimethyl carbamate.
[3] 1-isopropyl-3-methylpyrazolyl-5-dimethyl carbamate.
[4] 1, dimethyl carbamoyl-5-methyl-3-pyrazolyl dimethyl carbamate.
[5] 4-dimethyl amino-3-5 xylyl methyl carbamate.

*Fungicide test procedure*

(Agar plate tests)

*Fusarium oxysoporum* var. *lycopersici*. The fungi are grown 5 to 7 days prior to use in each test.

The standard in these tests is Maneb* at 24 parts per million (p.p.m.) against Fusarium.

Media: Dextrin A—Potato Dextrose Agar (PDA), supplied by Difco Laboratories, Detroit, Michigan, is used for the fungistatic test. Each medium is prepared according to manufacturer's instructions (39 grams PDA/liter; 23 grams NA/liter). Nineteen milliliters (ml.) of each medium are place in 50 ml. test tubes and sterilized by autoclaving for 15 minutes at 15 P.S.I.

The synergist (SK & F No. 525-A) is prepared at a concentration of 1.25%. Three additional dosages are prepared of 0.020, 0.01 and 0.002%. Distilled water is used as the solvent for the synergist (SK & F No. 525-A). To the solution is added a non-ionic wetting agent, then made up to volume with distilled water.

One milliliter of solution or suspension from each of the above chemical dosage series is added to the 19 ml. of sterile media, shaken to disperse the chemical, then poured in sterile 90 millimeter (mm.) Petri dishes, and the mixture allowed to solidify. The final dosage-series for each chemical is 10, 5 and 1 p.p.m.

From the appropriate fungus cultures a 5 mm. disk is cut from the advancing margin and placed, mycelium down, on the surface of the agar of the test plate near the edge of the dish. Controls are included and each test is duplicated. Incubation temperature is 24° C.

*Manganese ethylenebis di-thio carbamate.

Radial measurements are made for each fungus colony. The degree of fungistatis is determined by:

Percent inhibition =

$$\frac{\text{growth (mm.) on test chemical} - \text{PDA medium}}{\text{growth (mm.) on PDA}} \times 100$$

Fungistatic effectiveness of each chemical is defined as that dosage which gives "complete" inhibition.

The results are shown in tabular form in Table II

TABLE II.—EFFECTS OF COMPOUND SK & F NO. 525-A ON TOXICITY OF A CARBAMATE FUNGICIDE TO A REPRESENTATIVE FUNGUS

[Agar plate test with *Fusarium oxysporum* with—]

| Material tested | Dose | | Average growth of fungus in (mm.) |
|---|---|---|---|
| | p.p.m. | Percent w./v. | |
| SK & F 525-A, alone | 10 | 0.001 | 35.0 |
| Acetone, control | 10 | 0.001 | 35.5 |
| Maneb,[1] alone | 25 | 0.0025 | 24.0 |
| Maneb plus SK & F 525-A | (25+1) | (0.0025+0.0001) | 19.5 |
| Do | (25+5) | (0.0025+0.0005) | 0 |
| Do | (25+10) | (0.0025+0.0001) | 0 |

[1] Manganese ethylenebis di-thio carbamate.

It can be seen from the preceding data that the combination of any of a number of pesticidal carbamates and SK & F No. 525-A was outstandingly superior to either the carbamate alone or SK & F No. 525-A alone, and resulted in a much greater effect than would be predictable, based on the additive effect of these two materials. The data shows that the synergistic combination of a carbamate and SK & F No. 525-A may be used in a variety of methods of application, and is applicable to a variety of pest species, giving substantially uniform and complete pest control at relatively low doses, thus achieving significant economy in the consumption of the more effective, less residual, but more expensive, carbamate pesticides.

For example, a dose of 6 micrograms of 1-naphthyl-N-methyl carbamate per fly effected a 35% mortality, whereas 2½ fold increase in fly mortality was achieved with the same amount of 1-naphthyl-N-methyl carbamate synergized by the addition of 2 micrograms of SK & F No. 525–A, for a total of 8 micrograms of insecticidal composition.

The exact amount of the synergistic mixtures of the present invention which should be employed in a pesticidal formulation will be found to vary rather widely and to a certain extent depends upon: the ratio of SK & F No. 525–A to the carbamate; the particular carbamate in which the synergist is employed; the method of dispersion; the nature of the insect pest to be controlled; and other factors recognized in the pesticidal arts. Concentrations as low as 0.0001% material weight per solvent volume can be effectively employed. In general, however, compositions containing from about 0.01 to 10% by weight/volume, in either a liquid or solid carrier, give excellent results. For some requirements stronger concentrations may be desirable up to a maximum of about 25% by weight/volume.

Liquid carriers which may be employed include water, mineral oils, and organic solvents, as well as other solvents, including wetting and suspending agents. Solid carriers which may be employed are talc; bentonite; attapulgite; diatomaceous earth, silica; synthetic precipitated silica; pyrophyllite; fuller's earth; lime; gypsum; and flour derived from cotton seeds, walnut shells, corn cobs, or other similar powders.

The composition may also contain additives such as wetting agents, binding agents, gases compressed to the liquid stage, odorants, stabilizers, and the like. The compositions can be applied as dispensing liquid sprays or gas-propelled sprays.

In the synergistic mixture of the present invention, the preparations of the two ingredients may vary from 0.01 to 20 parts by weight of SK & F No. 525–A to one part of carbamate pesticide, but preferably within the range of 0.05 to 0.5 part of SK & F No. 525–A to one part of said carbamate.

The synergistic mixture of the present invention is particularly useful for pesticidal spray compositions. It is frequently the practice in the art to manufacture a composition containing the active ingredient of the formulation in larger amounts than would normally be utilized in the pesticidal spray. Such a composition being called a "concentrate." Such compositions or concentrates are so formulated that by a proper and usually predetermined degree of dilution of the concentrates, a desired class of pesticides may be produced, as desired. Concentrates containing the synergistic mixture of my invention may be prepared by methods known in the art.

Various modifications and alterations of this invention will become apparent to those skilled in the art without departing from the scope and spirit of the invention, and it should be understood that the latter is not necessarily limited to the aforementioned disclosure.

I claim:

1. An insecticidal spray composition comprising a solution of 1 part by weight of an insecticidal aryl carbamate selected from the group consisting of 1-naphthyl-N-methyl carbamate; 3-methyl-1-phenyl-5-pyrazolyl dimethyl carbamate; 4-dimethylamino-3-5-xylyl methyl carbamate; 3,5-diisopropylphenyl-N-methyl carbamate; 4-(methyl thio)-3,5-xylyl N-methyl carbamate; o-isopropoxyphenyl N-methyl carbamate; 4-dimethylamino-3-tolyl N-methyl carbamate; phenyl mercuric dimethyl di thio carbamate; 4-chloro-2-butynyl N-(3-chlorophenyl) carbamate; isopropyl N-(3-chlorophenyl) carbamate; isopropyl N-phenyl carbamate; and methyl N-(3-4-dichlorophenyl) carbamate and, as a synergist therefor from 0.01 to 20 parts by weight of β-diethylaminoethyl-2,2-diphenyl pentanoate.

2. A dry formulation of an insecticide comprising an inert insecticidal adjuvant as a carrier, 1 part by weight of an insecticidal aryl carbamate selected from the group consisting of 1-naphthyl-N-methyl carbamate; 3-methyl-1-phenyl-5-pyrazolyl dimethyl carbamate; 4-dimethylamino-3-xylyl methyl carbamate; 3,5-diisopropylephenyl-N-methyl carbamate; 4-(methyl thio)-3,5 xylyl N-methyl carbamate; o-isopropoxyphenyl N-methyl carbamate; 4-dimethylamino-3-tolyl N-methyl carbamate; phenyl mercuric dimethyl di thio carbamate; 4-chloro-2-butynyl N-(3-chlorophenyl) carbamate; isopropyl N-(3-chlorophenyl) carbamate; isopropyl N-phenyl carbamate; and methyl N-(3-4-dichlorophenyl) carbamate and, as a synergist therefor, from about 0.01 to about 20 parts by weight of β-diethylaminoethyl 2,2-diphenylpentanoate.

3. An insecticidal composition comprising 1 part by weight of an insecticidal aryl carbamate selected from the group consisting of 1-naphthyl-N-methyl carbamate; 3-methyl-1-phenyl-5-pyrazolyl dimethyl carbamate; 4-dimethylamino-3-xylyl methyl carbamate; 3,5-diisopropyl-phenyl-N-methyl carbamate; 4-(methyl thio)-3,5-xylyl N-methyl carbamate; o-isopropoxyphenyl N-methyl carbamate; 4-dimethylamino-3-tolyl N-methyl carbamate; phenyl mercuric dimethyl di thio carbamate; 4-chloro-2-butynyl N-(3-chlorophenyl)-carbamate; isopropyl N-(3-chlorophenyl) carbamate; isopropyl N-phenyl carbamate; and methyl N-(3-4-dichlorophenyl) carbamate and, as a synergist therefor, from 0.01 to 20 parts by weight of β-diethylaminoethyl-2,2-diphenylpentanoate.

4. A fungicidal composition comprising 1 part by weight of alkylene bis di thio carbamate selected from the group consisting of manganese ethylene bis di thio carbamate; di-sodium ethylene bis di thio carbamate; zinc ethylene bis di thio carbamate; and diammonium ethylene bis di thio carbamate and, as a synergist therefor, from 0.01 to 20 parts by weight of β-diethylaminoethyl 2,2-diphenylpentanoate.

5. The composition of claim 3 wherein said salt is 1-naphthyl-N-methyl carbamate.

6. The composition of claim 3 wherein said salt is 4-dimethylamino-3,5-xylylmethyl carbamate.

7. An insecticidal composition comprising 1 part by weight of 3-methyl-1-phenyl-5-pyrazolyldimethyl carbamate and, as a synergist therefor, from 0.01 to 20 parts by weight of β-diethylaminoethyl 2,2-diphenylpentanoate.

8. An insecticidal composition comprising 1 part by weight of 1-isopropyl-3-methyl-5-pyrazolyldimethyl carbamate and, as a synergist therefor, from 0.01 to 20 parts by weight of β-diethylaminoethyl 2,2-diphenylpentanoate.

9. An insecticidal composition comprising 1 part by weight of 1-dimethylcarbamoyl-5-methyl-3-pyrazolyl dimethyl carbamate and, as a synergist therefor, from 0.01 to 20 parts by weight of β-diethylaminoethyl 2,2-diphenylpentanoate.

10. Method of killing insects which comprises subjecting them to a lethally effective dose of an insecticidal composition comprising 1 part by weight of 1-naphthyl-N-methyl carbamate and, as a synergist therefor, from 0.01 to 20 parts by weight of β-diethylaminoethyl 2,2-diphenylpentanoate.

11. Method of killing insects which comprises subjecting them to a lethally effective dose of an insecticidal composition comprising 1 part by weight of 3-methyl-1-phenyl-5-pyrazolyldimethyl carbamate and, as a synergist therefor, from 0.01 to 20 parts by weight of β-diethylaminoethyl 2,2-diphenylpentanoate.

12. Method of killing insects which comprises subjecting them to a lethally effective dose of an insecticidal composition comprising 1 part by weight of an aryl carbamate selected from the group consisting of 1-naphthyl-N-methyl carbamate; 3-methyl-1-phenyl-5-pyrazolyl dimethyl carbamate; 4-dimethylamino-3-5-xylyl methyl carbamate; 3,5-diisopropylphenyl-N-methyl carbamate; 4-(methyl thio)-3,5 xylyl N-methyl carbamate; o-isopropoxyphenyl N-methyl carbamate; 4-dimethylamino-3-tolyl N-methyl carbamate; phenyl mercuric dimethyl di thio carbamate; 4-chloro-2-butynyl N-(3-chlorophenyl)-carbamate; isopropyl N-(3-chlorophenyl) carbamate; isopropyl N-phenyl carbamate; and methyl N-(3-4-dichlorophenyl) carbamate and, as a synergist therefor from 0.01 to 20 parts by weight of β-diethylaminoethyl 2,2-diphenyl pentanoate.

13. Method of killing fungi which comprises subjecting them to a lethally effective dose of a fungicidal composition comprising 1 part by weight of a pesticidal alkylene bis di thio carbamate selected from the group consisting of manganese ethylene bis di thio carbamate; di-sodium ethylene bis di thio carbamate; zinc ethylene bis di thio carbamate; and diammonium ethylene bis di thio carbamate and, as a synergist therefor, from 0.01 to 20 parts by weight of β-diethylaminoethyl 2,2-diphenylpentanoate.

14. Method of killing insects which comprises subjecting them to a lethally effective dose of an insecticidal composition comprising 1 part by weight of 1-isopropyl-3-methyl-5-pyrazolyldimethyl carbamate and, as a synergist therefor, from 0.01 to 20 parts by weight of β-diethylaminoethyl 2,2-diphenylpentanoate.

15. Method of killing insects which comprises subjecting them to a lethally effective dose of an insecticidal composition comprising 1 part by weight of 1-dimethylcarbamoyl-5-methyl-3-pyrazolyldimethyl carbamate and, as a synergist therefor, from 0.01 to 20 parts by weight of β-diethylaminoethyl 2,2-diphenylpentanoate.

16. Method of killing insects which comprises subjecting them to a lethally effective dose of an insecticidal compositing comprising 1 part by weight of 4-dimethylamino-3,5-xylylmethyl carbamate and, as a synergist therefor, from 0.01 to 20 parts by weight of β-diethylaminoethyl 2,2-diphenylpentanoate.

17. Method of killing fungi which comprises subjecting them to a lethally effective dose of an fungicidal composition comprising 1 part by weight of manganese ethylenebis di-thio carbamate and, as a synergist therefor, from 0.01 to 20 parts by weight of β-diethylaminoethyl 2,2-diphenylpentanoate.

References Cited by the Examiner

Chemical Abstracts, 57: 7665a (1962).

Frear, Pesticide Index, College Science Publishers, State College, Pennsylvania, 1961, pages 42, 88, 91, 92, 127, 133, and 139.

Hewlett et al., Nature, vol. 192, p. 1273 (1961), as citing by Chemical Abstracts, 56: 10633b (1962).

JULIAN S. LEVITT, *Primary Examiner.*

FRANK CACCIAPAGLIA, JR., *Examiner.*

J. D. GOLDBERG, *Assistant Examiner.*